(12) United States Patent
Jantz et al.

(10) Patent No.: US 7,093,265 B1
(45) Date of Patent: Aug. 15, 2006

(54) METHOD AND APPARATUS FOR PROVIDING HIGHLY-TRANSPARENT, HOST-BASED MULTI-PATHING SUPPORT

(75) Inventors: Ray M. Jantz, Wichita, KS (US); Mike J. Gallagher, Wichita, KS (US); Jon D. Beadles, Wichita, KS (US)

(73) Assignee: LSI Logic Corporation, Milpitas, CA (US)

( * ) Notice: Subject to any disclaimer, the term of this patent is extended or adjusted under 35 U.S.C. 154(b) by 614 days.

(21) Appl. No.: 09/960,827

(22) Filed: Sep. 21, 2001

(51) Int. Cl.
*G06F 9/44* (2006.01)

(52) U.S. Cl. .................. 719/321; 709/230; 710/316

(58) Field of Classification Search ............... 719/321, 719/324–327; 709/227–230; 710/300, 305, 710/316
See application file for complete search history.

(56) References Cited

U.S. PATENT DOCUMENTS

| | | | | |
|---|---|---|---|---|
| 5,412,798 A | * | 5/1995 | Garney | 719/321 |
| 5,732,282 A | * | 3/1998 | Provino et al. | 719/324 |
| 6,009,476 A | * | 12/1999 | Flory et al. | 719/324 |
| 6,145,028 A | * | 11/2000 | Shank et al. | 710/31 |
| 6,173,374 B1 | * | 1/2001 | Heil et al. | 711/148 |
| 6,233,624 B1 | * | 5/2001 | Hyder et al. | 719/327 |
| 6,341,356 B1 | * | 1/2002 | Johnson et al. | 714/4 |
| 6,470,397 B1 | * | 10/2002 | Shah et al. | 709/250 |
| 6,625,747 B1 | * | 9/2003 | Tawil et al. | 714/6 |
| 6,704,812 B1 | * | 3/2004 | Bakke et al. | 710/38 |

* cited by examiner

*Primary Examiner*—William Thomson
*Assistant Examiner*—George L. Opie
(74) *Attorney, Agent, or Firm*—Suiter West Swantz PC LLO

(57) ABSTRACT

A host computer environment includes a driver stack having a disk driver and a host bus adapter (HBA) driver. The driver stack further includes a multipath driver functionally embedded between the disk driver and HBA driver. At this hierarchical layer of the driver stack, the multipath driver functions at the command transport protocol level. The disk driver effectively views the multipath driver as a HBA driver type, while the HBA driver effectively views the multipath driver as a disk driver type. The multipath driver is configured to instantiate proxy virtual paths to the disk array that are visible to the host operating system but otherwise conceal the underlying physical paths. The multipath driver retains knowledge of the mapping between the physical and virtual paths. The disk array is configured to report itself to the OS as a non-disk device type, although its true identity is known by the multipath driver.

15 Claims, 5 Drawing Sheets

METHOD AND APPARATUS FOR PROVIDING HIGHLY-TRANSPARENT, HOST-BASED MULTI-PATHING SUPPORT

BACKGROUND OF THE INVENTION

1. Field of the Invention

The present invention relates to computer-related architectures for providing I/O path redundancy to storage devices, and, more particularly, to a method and apparatus for transparently and seamlessly integrating multi-pathing processes into host operating system environments.

2. Description of the Related Art

Multipath drivers provide system designers with the ability to develop redundant pathways that can support the seamless continuation of I/O communications despite the failure or degradation of some of the paths. However, a significant concern facing system integrators involves the ability to incorporate the multipathing functionality into the host operating system without impacting the performance and integrity of the operating system. In particular, it is important not to disrupt the operating system view and management of the I/O device space.

A related issue concerns the ability to embed a multipath driver into the host operating system (OS) in a manner that fosters portability. For example, it would be desirable to develop a multipath driver that could be ported from one operating system to the next while remaining relatively independent of the OS platform. However, conventional multipath drivers are tightly coupled to the operating system in view of their implementation at the top of the driver stack above the device driver.

SUMMARY OF THE INVENTION

According to the present invention there is provided a host computer system environment including a driver stack having a device driver, a multipath driver, and a host bus adapter (HBA) driver. The driver stack has a functional model based upon a multi-layered hierarchical organization, i.e., a multi-tier or multi-level functional construction.

The driver stack hierarchy is configured such that the multipath driver is interfaced to and functionally embedded between the device driver and the HBA driver at an intermediate layering position. This compares favorably to conventional designs, which place the multipath driver at the top of the driver stack above the device driver. Compared to conventional arrangements, the multipath driver according to the invention is embedded into the host computer environment at a relatively lower functional layer.

One feature of the driver stack built according to the present invention is that the multipath driver functions at the command transport protocol level of the host computer environment. As a result, the disk driver effectively views the multipath driver as a HBA-type device, while the HBA driver effectively views the multipath driver as a disk driver-type device.

The individual driver modules are implemented with suitable combinations of hardware and/or software. The programming and interface techniques for integrating these components employ conventional techniques well known to those skilled in the art.

In one illustrative form, the driver stack is configured to handle input/output (I/O) requests generated at the user application level that take the form of read/write system calls directed to a storage facility such as a disk subsystem. Moreover, the driver stack is suitably implemented to handle access calls pertaining to a Small Computer System Interface (SCSI) environment. For example, the driver stack can process I/O requests directed to target-type SCSI disk peripheral devices. In this configuration, the host bus adapter preferably serves as a SCSI host adapter or controller (e.g., an initiator).

The invention, in one form thereof, is directed to a method for use in a host computer environment. The host computer environment includes a device driver environment and a host bus adapter (HBA) driver environment. According to the method, the connectivity between the device driver environment and the HBA driver environment is managed using a multipathing process. The multipathing process is preferably performed by a multipath driver.

The driver stack for the host environment is specifically characterized by the multipath driver being functionally layered between the device driver environment and the HBA driver environment. This enables the multipathing process to occur at a command transport protocol level.

In one form, management of the connectivity between the device driver environment and HBA driver environment further involves the multipathing process operatively receiving a device command construct from the device driver environment and directing the device command construct to the HBA driver environment. The device command construct preferably defines a translation of an I/O request performed by the device driver environment.

The HBA driver environment, in one form thereof, is configured with a disk array environment. The method further involves causing the disk array environment to present itself as a non-disk device type to a host computer operating system.

Additionally, the multipathing process is caused to instantiate a virtual path to the disk array environment. The instantiated virtual path is visible to a host computer operating system.

In another form, the device driver environment and the HBA driver environment are configured to support SCSI-related I/O operations.

The invention, in another form thereof, is directed to a system for use with a host computer environment. The host computer environment includes a device driver environment and a host bus adapter (HBA) driver environment. The system further includes a multipath driver that is functionally interposed between the device driver environment and the HBA driver environment.

In this implementation, the multipath driver is configured to function at a command transport protocol level. In one form, the multipath driver is configured to receive a device command construct from the device driver environment and to transport the device command construct to the HBA driver environment.

The system, in another form, further includes a disk storage environment operatively coupled to the HBA driver environment. The disk storage environment preferably includes a means to present the disk storage environment as a non-disk device type to a host computer operating system.

The multipath driver, in one form thereof, is configured to operatively instantiate a virtual path to a device environment operatively coupled to the HBA driver environment. The instantiated virtual path is visible to a host computer operating system.

The invention, in another form thereof, is directed to a computer program product for use in a host computer environment. The host computer environment includes a device driver environment and a host bus adapter (HBA) driver environment. The computer program product includes a computer usable medium having computer readable program code thereon executable by the host computer environment. The computer readable program code performs a method that defines a multipath driver function. The method performed by the computer readable program code involves managing the connectivity between the device driver environment and the HBA driver environment.

The computer readable program code, in one form thereof, further includes program code for operatively interfacing with the device driver environment, and program code for operatively interfacing with the HBA driver environment.

The computer readable program code, in another form thereof, further includes program code for operatively instantiating a virtual path to a device environment that is operatively coupled to the HBA driver environment. The instantiated virtual path is visible to a host computer operating system.

The method performed by the computer readable program code, in one form thereof, further comprises the step of instantiating a virtual path to a device environment operatively coupled to the HBA driver environment, wherein the instantiated virtual path is visible to a host computer operating system.

The method performed by the computer readable program code, in another form thereof, further includes the steps of receiving a device command construct operatively issued by the device driver environment, and executing a multipathing process to transport the device command construct to the HBA driver environment.

One advantage of the present invention is that the multipath driver has increased transparency to the operating system and application layer as compared to convention arrangements, due to its relatively lower-level functional position in the driver stack.

Another advantage of the present invention is that the multipathing process has been moved to a lower functional layer in the host computer hierarchical layer model, specifically enabling it to function at the command transport protocol level.

A further advantage of the invention is that operation of the multipath driver beneath the device driver layer (i.e., at the command transport protocol level) enables the multipath driver to bypass conventional considerations relating to open/close semantics and disk-level I/O control functions.

Another advantage of the invention is that functionally embedding the multipath driver between the device driver layer and HBA driver layer can be accomplished with seamless integration.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
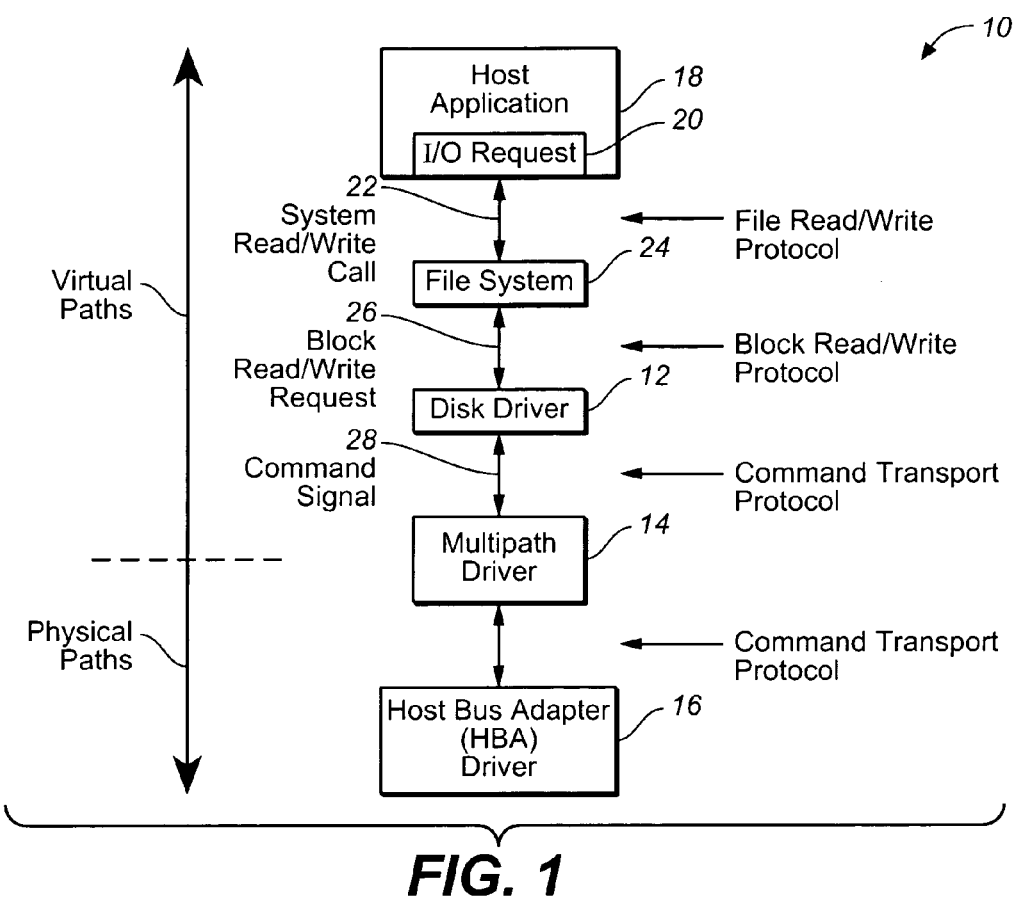
FIG. 1 is a simplified schematic block diagram illustration of a multi-level driver stack architecture showing the interrelationship between the various functional layers of the driver stack for use in a host computer, according to one embodiment of the present invention.

Referring now to the drawings and particularly to FIG. 1, there is shown in representative block diagram format a driver stack 10 for use in a host computer environment, according to one embodiment of the present invention.

In particular, the illustrated driver stack 10 includes in sequential functional order a disk driver 12, a multipath driver 14, and a host bus adapter (HBA) driver 16. As discussed further, one notable feature of driver stack 10 concerns the tiered positioning of multipath driver 14 relative to the other driver levels, namely, the multipath driver 14 is functionally layered or embedded between the functional layers occupied by disk driver 12 and HBA driver 16. This driver configuration compares favorably to conventional arrangements where the multipath driver typically sits atop the driver stack (i.e., above the device driver) at its highest functional level.

Driver stacks are conventionally understood to refer to the host-based process for processing input/output (I/O) requests generated at the highest functional level in the host computer environment. As known, this level corresponds to the application layer where user-interactive application programs are resident and accessible. The driver stack generally may be considered as the host-based mechanism for interfacing the high-level application layer to the low-level physical device layer where physical access connections are made to the designated recipient of the I/O request, i.e., a disk array or other storage structure. The tasks associated with such interfacing are well known to those skilled in the art, such as command construction, protocol conversion, and signal formatting.

As shown in FIG. 1, the functional architecture of driver stacks is based on a hierarchical model having a multi-level or multi-tier organization. According to this arrangement, the functional progression from a high-level driver position to a low-level driver position corresponds generally to a counterpart progression in the host computer from a high-level layer (e.g., operating system level such as applications, file system, database managers, and management utilities) to a low-level layer (e.g., Peripheral Component Interconnect (PCI) bus)).

Referring again to FIG. 1, the operational context of driver stack 10 involves (in one illustrative form) the processing of an I/O request generated at the application layer of the host computer. In particular, a conventional host application 18 generates an I/O request 20. For example, I/O request 20 may typically correspond to a device access request such as a read/write (R/W) operation relating to a disk array. In one form, the read/write request may be implemented in known fashion as a system read/write call 22 directed to file system 24.

The host computer environment includes file system 24 that employs a conventional block-type data model. File system 24 operates conventionally to interpret system read/write call 22 and issue a corresponding block read/write request 26. For example, file system 24 invokes the appropriate entry points in disk driver 12 to handle the block read/write request 26. File system 24 and disk driver 12 are suitably interfaced in a conventional fashion to facilitate this interaction.

Disk driver 12 provides a conventional function involving the translation of the I/O request into a corresponding command structure that is recognizable by the target device (i.e., disk) and which implements the I/O request in a command form suitable to effectuate the desired I/O operation. Referencing FIG. 1, the block read/write request 26 from file system 24 is translated by disk driver 12 into a corresponding command signal 28.

The illustrated multipath driver 14 provides a conventional function involving the control and management of the path selection that routes and otherwise directs the I/O request to the target device environment. As part of driver stack 10, multipath driver 14 transports command signal 28 from disk driver 12 to HBA driver 16. As discussed further in connection with FIGS. 3 and 4, HBA driver 16 forms part of a disk subchannel path selected by multipath driver 14.

Accordingly, the indicated connection between multipath driver 14 and HBA driver 16 is broadly representative of the connectivity that multipath driver 16 operationally establishes between the disk driver layer and the HBA driver layer. In particular, multipath driver 14 selectively establishes connectivity between the device driver layer and the disk subchannel system. As known, the multipathing process can select the path (i.e., disk subchannel) for transporting command signal 28.

Multipath driver 14 takes advantage of physical data path redundancy for data path error recover and, in some cases, I/O load balancing. Preferably, multipath driver 14 operates in a known manner that is transparent to the operating system, i.e., the application layer components and file system.

For purposes of integrating multipath driver 14 into driver stack 10, the hardware/software combination that embodies the multipathing process (e.g., program code) is adapted and otherwise configured to facilitate and otherwise enable a suitable effective interface with disk driver 12 and HBA driver 16. For example, the software module for the multipath controller will be suitably configured to handle and otherwise conform to the necessary communication protocols associated with establishing and maintaining seamless connectivity with the higher-level device driver layer and the lower-level HBA driver layer.

This adaptation may be made in relation to any type of device driver implementation and HBA driver implementation using software integration techniques well known to those skilled in the art. For example, a conventional understanding of the interface and protocol specifications for disk driver 12 and HBA driver 16 would enable one skilled in the art to construct the suitable software interfaces in multipath driver 14. This integration feature is described more fully in connection with FIG. 7.

Multipath driver 14 may employ any type of multipathing process known to those skilled in the art. Multipath driver preferably will contain features that support a failover function, an auto-failback function, and dynamic I/O load balancing.

As known to those skilled in the art, failover refers to the process by which the multipath controller changes its I/O from a primary path to an alternate path, such as when path errors are detected on the primary path. Relatedly, failback refers to the process by which a failed-over controller changes its I/O from the alternate path back to its primary path after the primary path becomes operational again. For example, the automated process of a typical auto-failback function acts to restore a failed path to service when it is found to again be usable by a timer-interrupt-driven thread.

Multipath driver 14 may also implement an I/O load balancing process that dynamically allocates the I/O load (e.g., queue of individual I/O requests) among the various device subchannel paths. In this manner, multiple device paths are concurrently used to transport the various I/O requests to the HBA driver layer and thereafter to the target device (e.g., disk array).

A related function of multipath driver 14, when there are no errors to account for, is path selection on every dispatch. Additionally, in one illustrative form, multipath driver 14 has various path selection models and will employ the appropriate one based on information from device discovery. One model implements a preferred path/alternate path technology that can be found, for example, in disk array multipath products available from LSI Inc. of Milpitas, Calif. Another model implements a symmetric load balancing technology that can be found, for example, in the LSI Logic ContinuStor Director™ product. Various combinations of these path selection models may be used (along with different types of disk arrays), where symmetric load balancing can be applied across (i.e., between and among) ports on a controller, while the preferred path/alternate path strategy is used across controllers.

HBA driver 16 is a conventional component that generally provides a protocol conversion function enabling communications across physical interfaces having different protocols. In one exemplary capacity, HBA driver 16 serves as an interface between the host internal bus (e.g., PCI bus) and the external peripheral device environment (e.g., SCSI bus) that adapts the protocols used by each to allow seamless communications across the interface.

Figure 3:
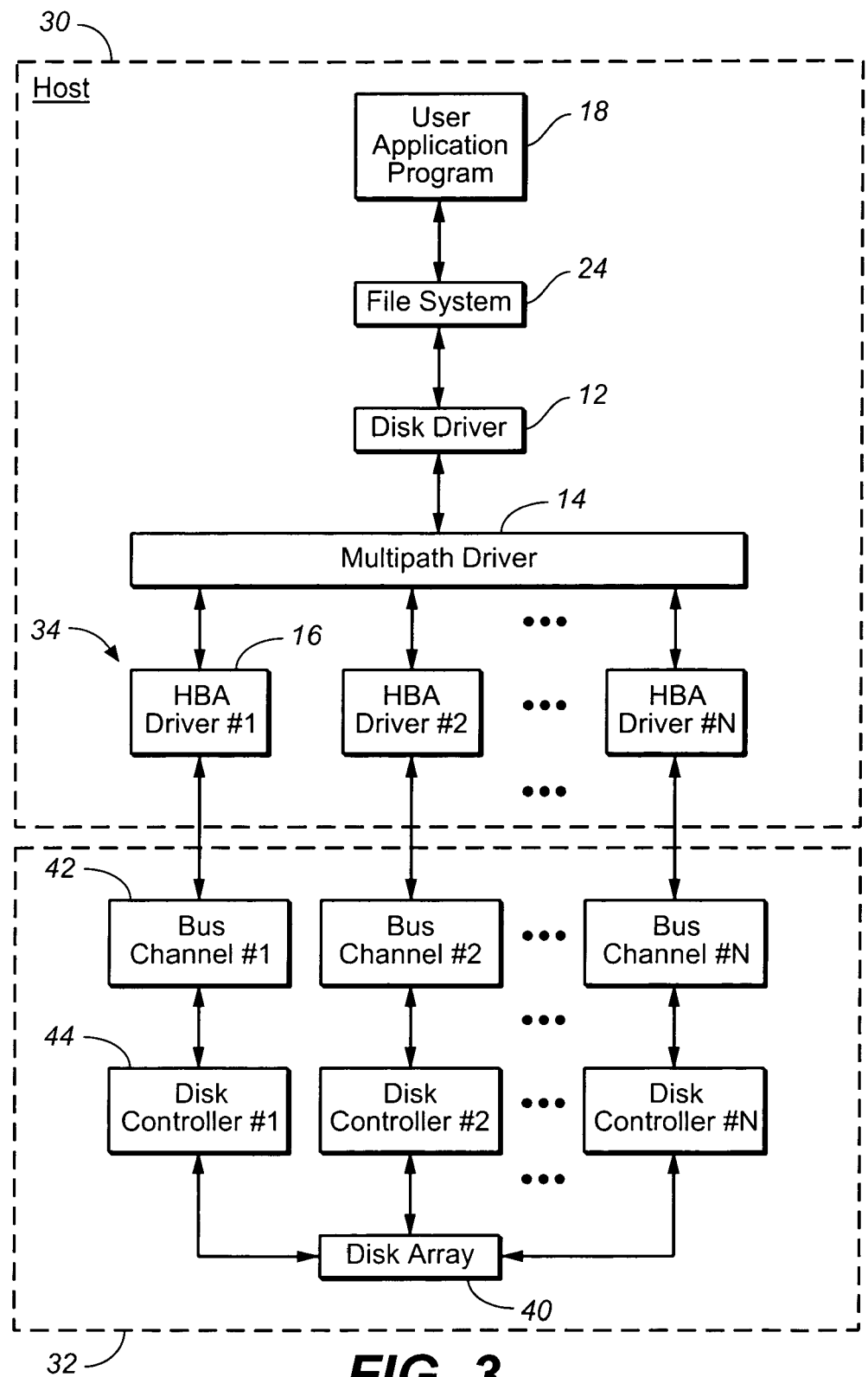
FIG. 3 is a schematic block diagram illustration of a host computer system environment incorporating the driver stack of FIG. 1, according to another embodiment of the present invention.
Figure 4:
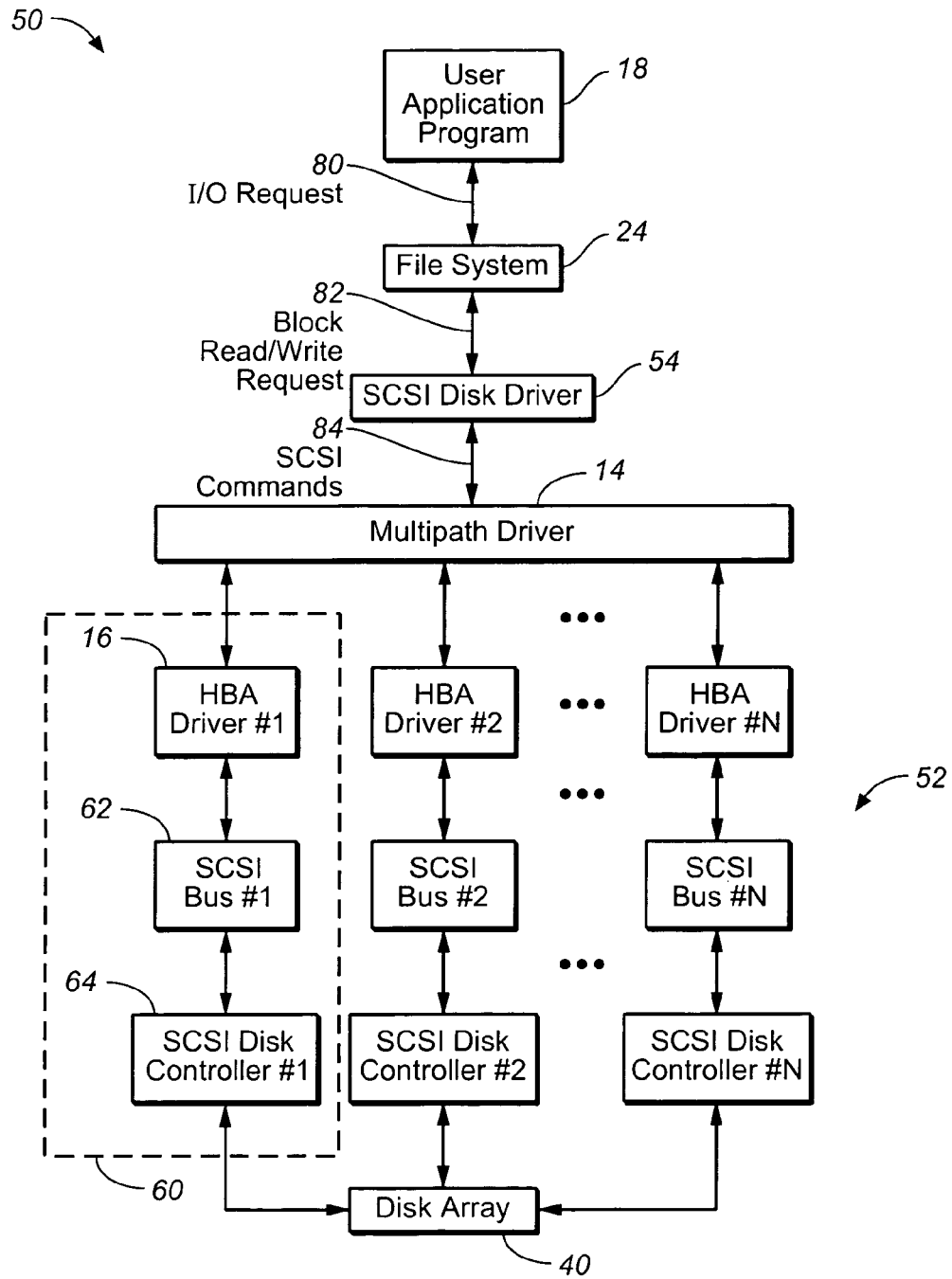
FIG. 4 is a schematic block diagram illustration of one configuration of the host computer system environment of FIG. 3 directed to a SCSI environment in combination with a disk storage array, according to another embodiment of the present invention.

In FIG. 1, HBA driver 16 forms part of the path subchannel selected by multipath driver 14 for transport of the I/O request, i.e., command signal 28 issued by disk driver 12. It should be apparent that HBA driver 16 is representative of various other such HBA drivers that may have connection to multipath driver 14. FIGS. 3 and 4 show various multipath configurations depicting illustrative subchannel arrangements with HBA drivers, as described further.

It should be understood that various elements of the host computer environment may be implemented in any suitable form and generally should be considered as referencing conventional components. For example, host application 18, file system 24, and particularly disk driver 12 and HBA driver 16 have conventional constructions. Accordingly, the discussion of these components herein is merely illustrative and should not be considered in limitation of the present invention. Any combination of hardware and/or software may be used to implement the components.

Moreover, although the device driver layer of driver stack 10 is shown employing disk driver 12 to facilitate the servicing of a disk access request, this depiction should not be considered in limitation of the present invention. Rather, it should be apparent that the device driver layer of driver stack 10 can be implemented with any suitable device driver and still provide the same hierarchical structure and functionality. For example, a network driver may be used to perform the required translation relating to network access requests.

Furthermore, although driver stack 10 is shown employing HBA driver 16, this depiction should not be considered in limitation of the present invention as it should be apparent that this level of driver stack 10 may be implemented in any functionally equivalent manner. HBA driver 16 should therefore be considered as being generally representative of any suitable facility that fulfills the low-level functionality associated with this layer of driver stack 10, e.g., a physical device interface mechanism. In one alternate form, for example, this low-level layer may be configured with a network interface card to enable interfacing to a network connection.

Additionally, the multipathing process performed by multipath driver 14 may be implemented in any suitable form of hardware, software, firmware, control logic, circuitry, programmable devices, or any combination thereof.

Additionally, although FIG. 1 references the use of disk systems as the storage medium, this description should not be considered in limitation of the present invention as it should be apparent that I/O requests may be made in connection with any suitable storage facility, e.g., CD-ROM, RAID (Redundant Array of Inexpensive Disks) system, optical storage medium, magnetic storage medium, and tape. For this purpose, a suitable device driver would be used as known to those skilled in the art.

Figure 2:
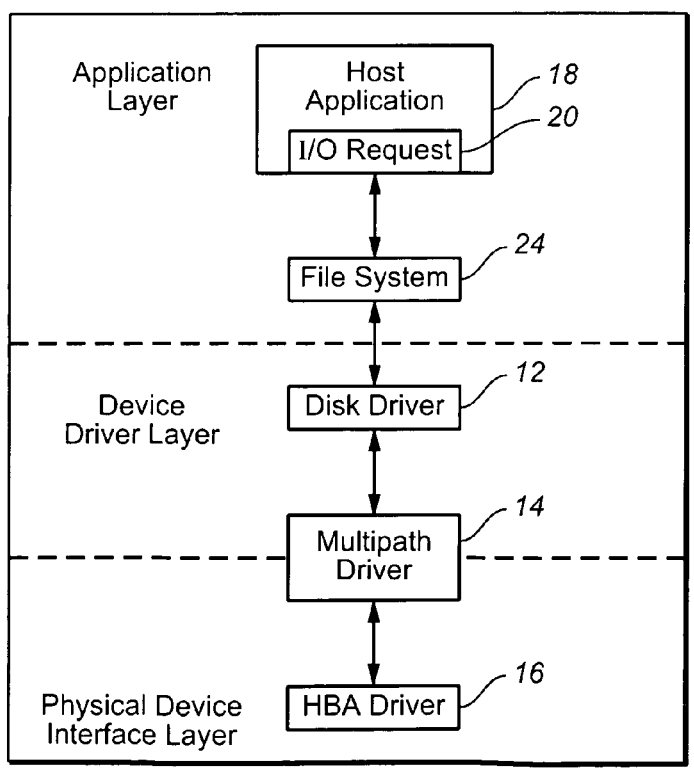
FIG. 2 is a block diagram view of the driver stack of FIG. 1 as superimposed on a host-based layering model to illustrate in representative fashion the functional location of each driver process/module within the architecture.

Referring now to FIG. 2 in combination with FIG. 1, it is seen that the hierarchical structure of driver stack 10 has various advantageous features that stem from functionally interposing multipath driver 14 between the device driver layer (e.g., disk driver 12) and the HBA driver layer (e.g., HBA driver 16). In equivalent forms, it may be considered that such placement of multipath driver 14 involves functionally embedding, layering, or positioning multipath driver 14 in the indicated manner within driver stack 10.

The main advantages draw upon the relative positioning of multipath driver 14 within the layered functional model of the host computer system environment, as best shown by the hierarchical representation in FIG. 2. More specifically, unlike conventional arrangements where the multipath driver interfaces with the high-level application layer (and must adhere to block read/write protocol specifications), driver stack 10 configures multipath driver 14 at a comparatively lower functional level, namely, the physical device interface layer where HBA driver 16 resides and adherence must only be made to the relatively less demanding command transport protocol specifications.

In conventional driver stack models, the multipath driver is located above the device driver at the highest layer in the driver stack. Due to this proximate functional closeness between the multipath driver and the application layer, the multipath driver exhibits a high degree of coupling or linkage to the operating system (OS). Consequently, conventional multipath drivers typically must be cognizant of and compliant with higher-level OS policies such as device name space management. This makes conventional multipath drivers difficult to port to other host platforms due to their dependency on high-level system requirements and specifications.

In this regard, driver stack 10 compares favorably to conventional stack arrangements by virtue of having multipath driver 14 positioned (relocated) to a relatively lower functional level within the stack hierarchy. By increasing the functional "distance" between multipath driver 14 and the operating system, multipath driver 14 becomes more removed and essentially uncoupled from the operating system.

As a result, multipath driver 14 is much more transparent to the operating system and applications environment as compared to other common approaches to multipathing. Multipath driver 14 also possesses superior portability, again due to its positioning at such a low level in the driver stack that higher-level system dependencies are effectively avoided. This distinguishes favorably from conventional multipath drivers, which are tightly coupled to the operating system.

In terms of installation, multipath driver 14 provides transparent, seamless integration into the host operating system environment, since its position at such a low level in the driver stack avoids the possibility of any intrusion on higher-level OS policies, compatibilities, and interface requirements. However, multipath driver 14 continues to remain essentially independent of the host adapter technology since the driver stack level occupied by multipath driver 14 is not so low as to necessitate writing host-adapter-dependent code.

Regarding a further advantage, brief mention again is made to the drawbacks of typical host environment configurations. In conventional driver stack models, the multipath driver is located above the device driver at the block read/write protocol level, which necessitates an interface with the application layer.

However, according to the present invention, multipath driver 14 has been moved to a relatively lower functional level, namely, the command transport protocol level. This placement is indicated in the protocol layering representatively depicted in FIG. 1. Along with making the multipathing process more transparent to the operating system, this low-level positioning of multipath driver 14 eliminates the OS-dependent demands that otherwise attend integration at the high-level functional layers, as is typical of conventional multipath drivers.

In particular, since multipath driver 14 now is functionally layered beneath disk driver 12, there no longer is the need as before to have the interface with the high-level application layer nor does multipath driver 14 have to provide attendant compatibility and conformance with the block read/write protocol. Rather, the interface specifications for multipath driver 14 simply must accommodate the command transport protocol that defines the communications between disk driver 12 and HBA driver 16.

Certain advantages follow from this avoidance of an interface with the high-level application layer. For explanatory purposes, it should also be considered that embedding multipath driver 14 between disk driver 12 and HBA driver 16 at the command transport protocol level also has the effect of redefining the perceived relationship between the multipathing process and each of the device driver and HBA driver.

Notably, multipath driver 14 is effectively perceived and/or viewed by disk driver 12 simply as an HBA driver-class component, while multipath driver 14 is effectively perceived by HBA driver 16 simply as a disk driver-class component. This "viewing" relationship is unlike conventional arrangements, where the multipath driver resides above both the disk driver and HBA driver.

Regarding one advantage, the positioning of multipath driver 14 beneath the device driver layer enables open/close semantics to be bypassed. In typical host platforms, the protocol between the file system and device driver involves open/close semantics. Accordingly, when the multipath driver resides above the device driver as in conventional arrangements, the multipath driver must include a facility to emulate and accommodate this open/close protocol format.

Unlike conventional arrangements, multipath driver 14 need not have any facility to address open/close semantics since the command transport protocol level does not employ such an open/close protocol. The importance of this feature is apparent from the fact that the variation in open/close semantics between the UNIX and Windows NT™ operating systems at the disk class level (e.g., block read/write protocol level between the file system and device driver layer) raises concerns about portability.

As noted above, multipath driver 14 is perceptible as an HBA driver class device from the vantage point of higher-level components due to its residence at a low-level functional layer between disk driver 12 and HBA driver 16. Accordingly, since standard HBA drivers typically need not define functions that support the handling of or interactions with open/close semantics, multipath 14 likewise will not have to incorporate a similar functionality.

Additionally, disk-level I/O control functions are bypassed from the viewpoint of multipath driver 14. In typical host platforms, such control functions are handled by the disk driver layer. As a result, these I/O control functions tend to be tightly coupled to the host operating system and therefore serve as a source of added complexity and increased system dependency. Since conventional multipath drivers reside above the disk driver, a facility must be provided to emulate and/or accommodate handling of the I/O control functions. However, by virtue of its layered positioning beneath the disk driver in driver stack 10, multipath driver 14 need not be concerned with encountering disk I/O control functions.

Furthermore, the functional low-level layering of multipath driver 14 has an impact on the processing of I/O request queues and the overall management of I/O request traffic. In UNIX-based host platforms, for example, the I/O request queue depth is much lower at the HBA level than it is at the disk driver level. Accordingly, in conventional arrangements where the multipath driver is located above the disk driver level, queuing bottlenecks frequently occur.

A lower queue depth clearly promotes a faster "queue drain" time and therefore a faster failover process. It is therefore seen that multipath driver 14 offers improved throughput and a more robust and dynamic multipathing process since it is removed from typical queuing bottleneck areas (i.e., disk driver level) and thereby less susceptible to experiencing queue depth problems.

Moreover, the layering of multipath driver 14 yields certain advantages in a SCSI environment, such as that shown in FIG. 4. It is specifically seen that the positioning of multipath driver 14 between disk driver 12 and HBA driver 16 enables multipath driver 14 to have ready and unimpeded access to the SCSI command and sense data interface. As a result, multipath driver 14 does not have to defer, for example, to a user process for issuing commands and obtaining sense data.

Referring now to FIG. 3, there is shown a block diagram schematic view of one illustrative system implementation using the driver stack architecture of FIG. 1, according to another embodiment of the present invention.

The illustrated system shows a host computer environment 30 configured for connection and integration with a peripheral or external device environment 32, which in this implementation provides a conventional storage function employing well known disk arrays.

The illustrated host 30 includes a driver stack architecture similar to that shown in FIGS. 1 and 2. In particular, there is shown user application program 18, file system 24, disk driver 12, multipath driver 14, and representative HBA driver 16. As shown, the illustrated multipath driver 14 interfaces with a HBA driver stage or environment 34 including multiple HBA drivers 16.

The HBA driver stage 34 is configured with peripheral environment 32 in a known manner to form a system of plural individual disk subchannels serving as various redundant paths to the storage medium. For example, in one exemplary configuration, peripheral environment 32 includes multiple pathways from host 30 to disk array 40 comprising, in representative form, bus channel 42 and disk controller 44.

In illustrative form, it may be considered that each independently selectable disk subchannel includes, in combination, a respective arrangement of HBA driver 16, bus channel 42, and disk controller 44. In known manner, multipath driver 14 will function to manage the path control and selection among the various disk subchannels to establish connectivity with disk array 40.

In should be understood that the indicated configuration of peripheral environment 32 is provided for illustrative purposes only and should not be considered in limitation of the present invention. Rather, it should be apparent that any conventional or other suitable configuration may be used. Additionally, different implementations other than disk-based environments may be used.

One noteworthy feature evident from FIG. 3 is that the driver stack architecture requires only a single disk driver 12 in combination with multipath driver 14, despite the fact that multiple redundant paths are interfaced to multipath driver 14. No more disk drivers are needed since the redundant paths appear at a lower functional layer with multipath driver 14.

By comparison, in conventional arrangements where the multipath driver is positioned above the disk driver, it becomes necessary to provide multiple disk drivers for each of the redundant paths. In particular, each redundant path requires a disk driver in conventional approaches, adding to the implementation demands associated with conventional multipath drivers.

Referring now to FIG. 4, there is shown a block diagram schematic view of an illustrative SCSI-based system implementation using the driver stack architecture of FIG. 1, according to another embodiment of the present invention.

The illustrated system shows a host computer environment (indicated generally at 50) configured for connection and integration with a SCSI-based peripheral environment (indicated generally at 52) having disk array 40.

The illustrated host 50 includes a driver stack architecture similar to that shown in FIGS. 1 and 2. In particular, there is shown user application program 18, file system 24, a SCSI disk driver 54 (similar in functionality to disk driver 12), multipath driver 14, and representative HBA driver 16. The illustrated SCSI disk driver 54 is a well known conventional module enabling high-level I/O access requests to be translated into a corresponding suitably effective SCSI command construct that is sufficient, for example, to direct a disk controller to execute the requested I/O operation.

As shown, the illustrated multipath driver 14 interfaces with plural redundant disk subchannels 60 each representatively including HBA driver 16, SCSI bus 62, and SCSI disk controller 64. SCSI bus 62 and SCSI disk controller 64 are conventional components well known to those skilled in the art. In known manner, each disk subchannel 60 serves as a redundant pathway from host 50 to disk array 40. Multipath driver 14 functions in a known manner to manage the path control and selection among the various disk subchannels 60 to establish connectivity with disk array 40.

In should be understood that the indicated configuration of SCSI disk environment 60 is provided for illustrative purposes only and should not be considered in limitation of the present invention. Rather, it should be apparent that any other suitable SCSI architecture may be used. Additionally, the SCSI peripheral environment 52 may include peripherals other than and in addition to disk array 40.

Figure 5:
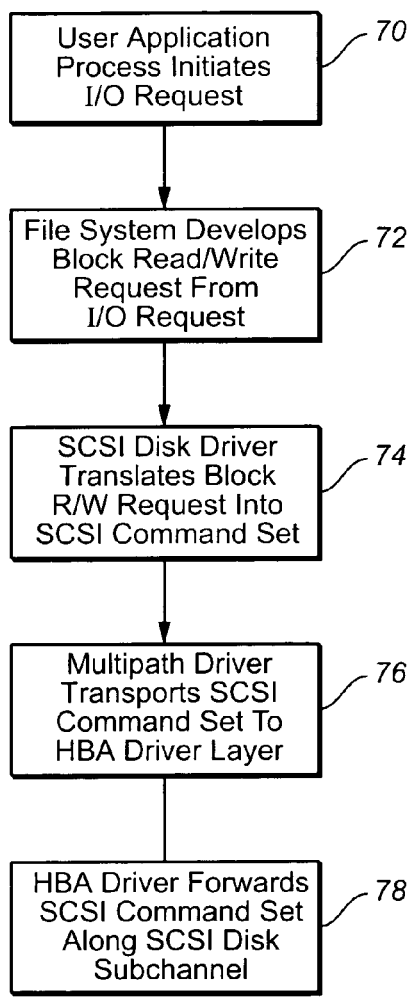
FIG. 5 is a flowchart depicting one illustrative operating sequence for processing an I/O request in the host computer environment of FIG. 4.

Referring now to FIG. 5, there is shown a flowchart illustrating an exemplary I/O request processing cycle for use in combination with the SCSI system environment of FIG. 4. For description purposes, reference is made both to FIGS. 4 and 5.

In conventional manner, the host computer application 18 issues an I/O request 80 such as a read/write operation (step 70). In response, file system 24 generates a suitable corresponding block read/write request 82 based upon the I/O request 80 and forwards this block-type request to SCSI disk driver 54 (step 72).

In response, SCSI disk driver 54 generates the appropriate disk command construct 84 that will suitably implement the requested I/O operation which underlies the block read/write request (step 74). For example, the SCSI disk commands will include control instructions directed to and executable by SCSI disk controller 64 for carrying out the specified data operation vis-à-vis disk array 40. The construction of the SCSI disk commands by SCSI disk driver 54 is performed in a manner well known to those skilled in the art.

Multipath driver 14 then executes a multipathing process to direct the transport of SCSI disk commands 84 along a selectively appropriate disk subchannel 60 (step 76). The relevant HBA driver 16 of the selected disk subchannel 60 then processes the transported SCSI disk commands 84 in a conventional manner to facilitate their subsequent transfer to SCSI disk controller 64 over SCSI bus 62 and otherwise support the communications between host 50 and peripheral environment 52 (step 78).

It should be understood that any return communications from peripheral environment 52 to host 50 (e.g., data read from disk array 40) will be conducted in a manner apparent to those skilled in the art. Moreover, the host-based operations likewise will be conducted in a manner apparent to those skilled in the art, particularly in regard to the driver stack.

Figure 6:
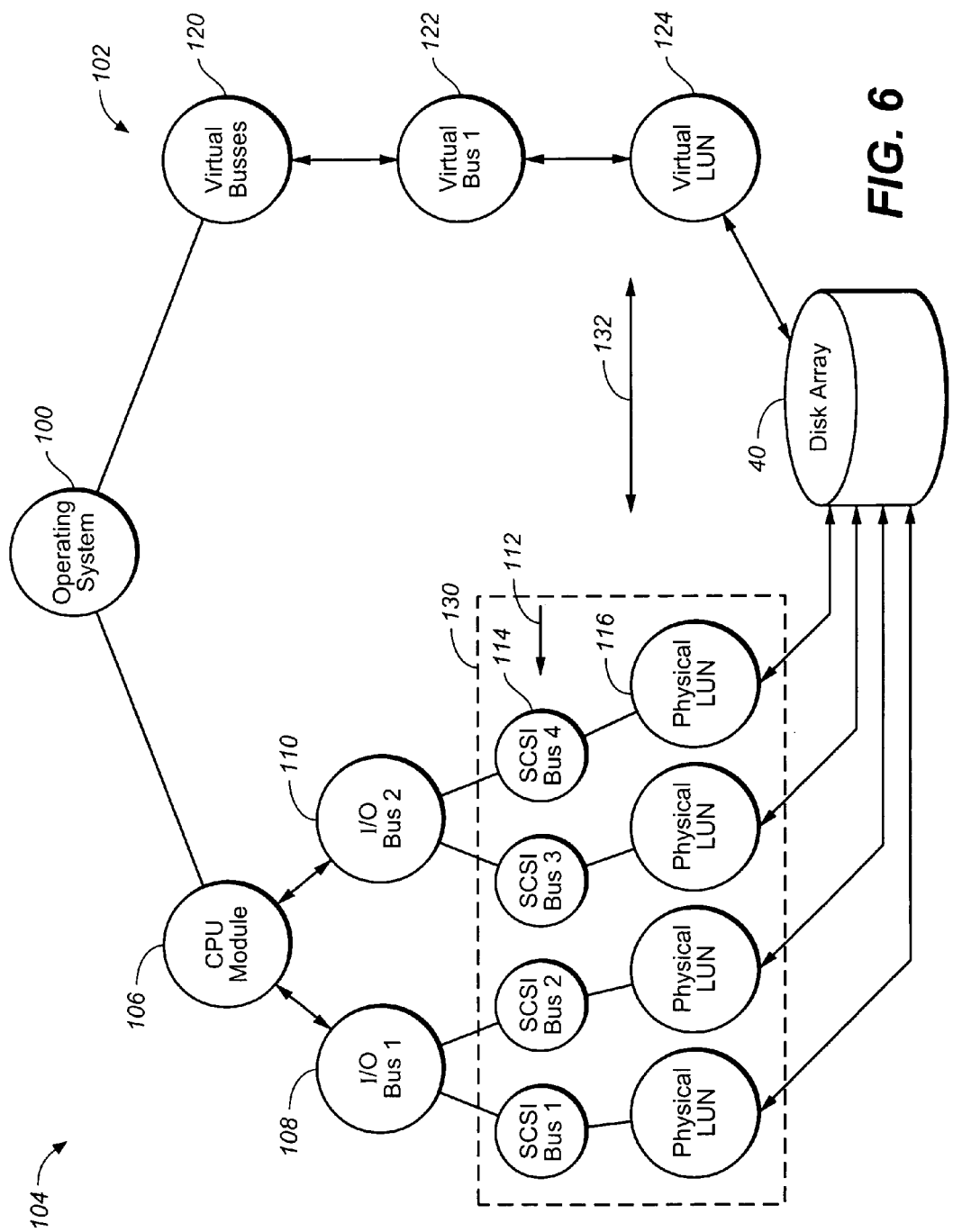
FIG. 6 is a pictorial representation of an illustrative operating system device tree exemplifying in side-by-side comparative view the virtual path connectivity and the corresponding underlying physical path connectivity that is realized by the multipath driver disclosed herein, according to another embodiment of the present invention.

Referring now to FIG. 6, there is shown a pictorial representation of an exemplary operating system (OS) device tree to illustrate various operating features of the multipath driver disclosed herein, according to another embodiment of the present invention.

In brief, FIG. 6 depicts the manner in which the multipath driver of the present invention features a process for characterizing a network of actual physical paths as simple virtual paths and presenting these path characterizations to the operating system as part of its interfacing process with the host environment.

The result is a form of virtual path definition that allows the operating system to view the device environment over simple virtual or proxy paths without any knowledge of the underlying physical connections, which as shown can be numerous and complex. This cooperative interaction between the host operating system and multipath driver relieves the operating system of any responsibility in handling low-level tasks, particularly the detailed processes associated with communications at the physical device interface layer.

By way of background, one traditional challenge that faces system integrators concerns the ability to embed the functionality of a multipath driver into the host operating system, while causing minimal disruption to the operating system's view of the I/O device space. Otherwise, if integration of the multipath driver exposes the redundant physical paths, the operating system has to undertake the task of accounting for and maintaining relationships with these visible paths.

It is therefore an object of the invention to address the problems that arise when physical device pathways are potentially exposed for viewing by the operating system. It is preferable to avoid this condition and limit the visibility of the physical device paths as perceived by the operating system. Multipath driver 14 addresses these concerns by implementing a process of proxy path instantiation, as discussed below.

One aspect of the architectural design exhibited by driver stack 10 of FIGS. 1 and 2 concerns the manner in which multiple paths are virtualized as a single, highly reliable data path, while still presenting a coherent view of paths and devices to the operating system. The key to fulfilling this objective is in limiting the visibility of the physical data paths to the multipath driver, so that the operating system is unaware of them.

One optional strategy adopted by the present invention is to direct that disk array 40 present itself to operating system (OS) 100 as a non-disk device type. The fact that the array is really a disk is a secret shared only by the multipath driver and the array. For this purpose, the multipath driver is provided with a facility to acquire and maintain information about this identity. The effect is to restrict physical path knowledge to the multipath driver and thereby not expose such paths to other parts of the system, namely, OS 100. This approach is particularly useful in OS platforms that provide mechanisms for restricting device visibility through a device claiming protocol.

Conventional mechanisms and facilities may be used to implement this device reporting feature concerning disk array 40. Several noteworthy advantages are provided in connection with having disk array 40 report itself as a unique (non-disk) device type, while ensuring that only the multipath driver retains knowledge of the true identity.

For example, device drivers typically run through a device interrogation process such as a probe operation to identify any devices that match a specified device type class for purposes of attachment thereto. It clearly is desired not to allow more than one device driver to attach to a certain target device since this otherwise would corrupt the OS device name space management.

In the present invention, by virtue of disk array 40 reporting itself as a non-disk device type, other disk drivers in the system that are looking for devices of type "disk" to attach to will not see the array through the physical paths, but only through the virtual paths created and managed by the multipath driver. Since the multipath driver alone is aware of the underlying identity of disk array 40, it is only through the virtual paths that type "disk" can be associated with disk array 40 and thereby made known as such to OS 100. As indicated before, no attachment is possible along the physical paths since disk array 40 reports itself to any probing disk driver as a unique non-disk device type.

Regarding another feature, the multipath driver implements a process of proxy path instantiation to virtualize the multitude of physical paths. For purposes of implementing the path claiming and virtualization, multipath driver 14 would include a facility to understand and interpret the host system-dependent protocol for exposing data paths and device. In this manner, multipath driver 14 can instantiate a proxy (virtual) path to the disk that is visible to the operating system, leaving the actual physical data paths unknown to the operating system.

The proxy path represents a single path to the media (i.e., disk array 40) as perceived by OS 100. However, using an internal mechanism, multipath driver 14 knows the association or mapping of the proxy-to-physical paths. The multipath driver can exploit this exclusive knowledge for conducting transparent path error recovery operations.

Referring specifically to FIG. 6, the process of path virtualization and proxy path instantiation is illustrated in the side-by-side comparison between the virtualized pathways 102 (right-side depiction) and the corresponding underlying physical pathways 104 (left-side depiction).

Referring first to the physical pathways 104, this illustrative configuration includes a typical central processing unit (CPU) module 106 and a set of I/d buses 108 and 110. The transition between CPU 106 and the I/O bus layer might correspond, for example, to a sequential progression from the application layer to the HBA driver layer (FIGS. 1 and 2). The I/O buses 108, 110 might typically represent an internal host bus such as a PCI bus.

The I/O buses 108, 110 would be interfaced by HBA driver 16 (FIG. 1) to a SCSI bus architecture 112 in which various individual representative SCSI buses 114 are connected to I/O buses 108, 110 in the illustrated manner. The SCSI buses 114 are then connected in a known manner to various representative physical LUNs 116 (Logical Unit Numbers) of disk array 40. This configuration is merely illustrative of representative physical pathways and should not be considered in limitation of the present invention, as it should be apparent that other physical pathway constructions may be virtualized according to the present invention.

By comparison, the logical view of physical pathway 104 perceptible by OS 100 is indicated by the simple corresponding virtual pathway 102 that is created by the multipath driver and presented to OS 100 as the definitive path between the host computer environment and disk array 40. All relevant operations of OS 100 employ this logical or virtual view of the connection between the host and disk array 40.

In particular, the illustrated virtual pathway 102 arbitrarily includes virtual busses 120, virtual bus 122, and virtual LUN 124. However, it should be apparent that any virtual path definition or construction can be created by the multipath driver to form a logical view of the connection between the host and disk array 40.

Notably, the entire physical architecture 130 between the host environment and disk array 40 is simply virtualized, for example, as virtual bus 122 and virtual LUN 124. Therefore, the existence and contents of physical architecture 130 remain hidden from OS 100, known only to the multipath driver. In particular, the multipath driver has knowledge of the virtual-to-physical associations or mapping definition 132 that defines the relational correspondence between the physical paths and the virtual paths.

The combination of techniques indicated above for embedding the multipath driver into the host operating system ensures that the disk array is not seen by OS 100 over different paths, whether virtual or physical. Accordingly, the multipath driver of the present invention does not corrupt the OS device name space that otherwise occurs by exposing both physical and virtual paths. As disclosed herein, OS 100 sees one path to the device (e.g., disk array 40) and therefore does not get confused by seeing the device more than once.

Figure 7:
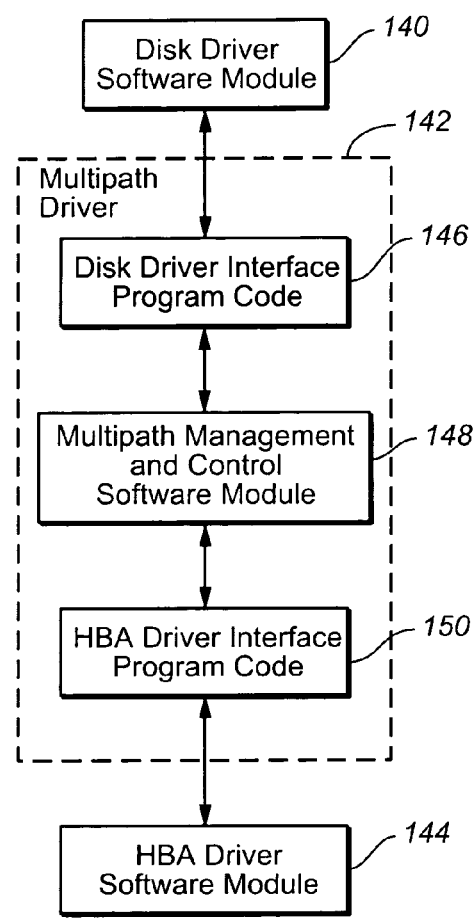
FIG. 7 is a simplified block diagram modular view of one illustrative software-based architecture for implementing the driver stack of FIG. 1 and specifically the multipath driver disclosed herein, according to another embodiment of the present invention.

Referring now to FIG. 7, there is shown a modular representation of the various software-related components included within the driver stack of FIG. 1, according to another embodiment of the present invention.

The illustrated driver stack includes, in combination, a disk driver software module 140 for use in implementing disk driver 12 (FIG. 1), a multipath driver software module 142 for use in implementing multipath driver 14, and a HBA driver software module 144 for use in implementing HBA driver 16. The illustrated disk driver SW module 140 and HBA drier SW module 144 are conventional components and may be provided in any suitable form.

The illustrated multipath driver SW module 142 includes, in combination, disk driver interface program code 146, multipath management and control software module 148, and HBA driver interface program code 150. The multipath SW module 148 should be considered as being generally representative of any means for implementing a multipathing process. Accordingly, multipath SW module 148 preferably includes a conventional construction and may be provided in any suitable form.

The illustrated program code 146 implements and otherwise facilitates the appropriate interfacing mechanisms between disk driver 12 and multipath driver 14. In particular, program code 146 adapts the appropriate interface of multipath driver 14 to conform to and other be made compatible with the interface protocol, specifications, and requirements of disk driver 12, as indicated by disk driver SW module 140. This adaptation renders multipath driver 14 and disk driver 12 interoperable with one another and supports seamless communications therebetween.

Similarly, the illustrated program code 150 implements and otherwise facilitates the appropriate interfacing mechanisms between HBA driver 16 and multipath driver 14. In particular, program code 150 adapts the appropriate interface of multipath driver 14 to conform to and other be made compatible with the interface protocol, specifications, and requirements of HBA driver 16, as indicated by disk driver SW module 144. This adaptation renders multipath driver 14 and HBA driver 16 interoperable with one another and supports seamless communications therebetween.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for use in a host computer environment, the host computer environment including a driver stack having a device driver, a host bus adapter (HBA) driver, and a multipath driver, the multipath driver being functionally layered between the device driver and the HBA driver, said method comprising the steps of:

managing connectivity between the device driver and the HBA driver using a multipathing process performed by the multipath driver of the driver stack, the multipath driver being configured to bypass open/close semantics and disk-level I/O control functions, the multipath driver operatively receiving a device command construct from the device driver and directing the device command construct to the HBA driver, the device command construct defining a translation of an I/O request.

2. The method as recited in claim 1, wherein the multipathing process is performed at a command transport protocol level of the driver stack.

3. The method as recited in claim 1, wherein the HBA driver is configured with a disk array environment.

4. The method as recited in claim 3, further comprising the step of:

causing the disk array environment to present itself as a non-disk device type to a host computer operating system.

5. The method as recited in claim 1, further comprising the step of:

causing the multipath driver to instantiate a virtual path to the disk array environment, the instantiated virtual path being visible to a host computer operating system.

6. The method as recited in claim 1, wherein the device driver and the HBA driver are configured to support SCSI-related I/O operations.

7. A system for use with a host computer environment, said host computer environment including a driver stack having a device driver, and a host bus adapter (HBA), said system comprising:

a multipath driver functionally interposed between said device driver and said HBA driver in the driver stack, the multipath driver being configured to bypass open/close semantics and disk-level I/O control functions, the multipath driver operatively receiving a device command construct from the device driver and directing the device command construct to the HBA driver the device command construct defining a translation of an I/O request.

8. The system as recited in claim 7, wherein the multipath driver is configured to function at a command transport protocol level of the driver stack.

9. The system as recited in claim 7, further comprising:
    a disk storage environment operatively coupled to the HBA driver.

10. The system as recited in claim 7, wherein said disk storage environment further comprises:

means for presenting said disk storage environment as a non-disk device type to a host computer operating system.

11. The system as recited in claim 7, wherein the multipath driver is configured to operatively instantiate a virtual path to a device environment operatively coupled to the HBA driver, the instantiated virtual path being visible to a host computer operating system.

12. A computer program product for use in a host computer environment, the host computer environment defining a driver stack including a device driver, a host bus adapter (HBA) driver, and a multipath driver being functionally layered between the device driver and the host bus adapter (HBA) driver, the computer program product comprising a computer useable medium having computer readable program code thereon executable by the host computer environment, the computer readable program code for causing the multipath driver to perform a method defining a multipath driver function for the driver stack, said method comprising the steps of:

managing connectivity between the device driver and the HBA driver through the multipath driver function, the multipath driver being configured to bypass open/close semantics and disk-level I/O control functions, the multipath driver operatively receiving a device command construct from the device driver and directing the device command construct to the HBA driver, the device command construct defining a translation of an I/O request.

13. The computer program product as recited in claim 12, wherein the computer readable program code further comprises:

program code for operatively interfacing with the device driver; and program code for operatively interfacing with the HBA driver.

14. The computer program product as recited in claim 12, wherein the computer readable program code further comprises:

program code for operatively instantiating a virtual path to a device environment operatively coupled to the HBA driver, the instantiated virtual path being visible to a host computer operating system.

15. The computer program product as recited in claim 12, wherein the method performed by the computer readable program code further comprises the step of:

instantiating a virtual path to a device driver operatively coupled to the HBA driver, the instantiated virtual path being visible to a host computer operating system.

\* \* \* \* \*